US008767087B1

(12) United States Patent
Li

(10) Patent No.: US 8,767,087 B1
(45) Date of Patent: *Jul. 1, 2014

(54) PREVENTING COLOR ARTIFACTS IN OVEREXPOSED REGIONS AND PRESERVING MAXIMUM SIGNALS IN NEAR-OVEREXPOSED REGIONS OF DIGITAL IMAGES

(71) Applicant: Marvell International Ltd., Hamilton (BM)

(72) Inventor: Hongxin Li, Shanghai (CN)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,949

(22) Filed: Sep. 16, 2013

Related U.S. Application Data

(63) Continuation of application No. 12/570,079, filed on Sep. 30, 2009, now Pat. No. 8,537,233.

(60) Provisional application No. 61/105,262, filed on Oct. 14, 2008.

(51) Int. Cl.
 *H04N 5/228* (2006.01)
(52) U.S. Cl.
 USPC ....................................... 348/222.1
(58) Field of Classification Search
 USPC ............ 348/22.1, 222.1, 223.1, 225.1, 229.1, 348/254, 280, 241
 See application file for complete search history.

(56) References Cited

U.S. PATENT DOCUMENTS

| | | | |
|---|---|---|---|
| 6,831,687 B1 * | 12/2004 | Suzuki | 348/251 |
| 7,346,210 B2 * | 3/2008 | Chen | 382/162 |
| 8,054,350 B2 * | 11/2011 | Kyung | 348/251 |
| 2004/0257454 A1 | 12/2004 | Pinto et al. | |
| 2006/0028577 A1 | 2/2006 | Honjo et al. | |
| 2007/0024720 A1 | 2/2007 | Awazu | |
| 2007/0091338 A1 | 4/2007 | Asada | |
| 2008/0101690 A1 | 5/2008 | Hsu et al. | |
| 2008/0204574 A1 | 8/2008 | Kyung | |
| 2008/0259180 A1 | 10/2008 | Ovsiannikov | |
| 2008/0266413 A1 | 10/2008 | Cohen et al. | |
| 2008/0279471 A1 | 11/2008 | Hunter | |
| 2009/0027727 A1 | 1/2009 | Ovsiannikov | |
| 2011/0058072 A1 | 3/2011 | Wang et al. | |

OTHER PUBLICATIONS

Finlayson et al., "Spectral sharpening: sensor transformations for improved color constancy," J. Optical Society of America, vol. 11, No. 5, May 1994.

* cited by examiner

*Primary Examiner* — Ahmed A Berhan

(57) ABSTRACT

Distortions in digital image data, for example, radial falloff and improper white balance, are corrected without introducing artifacts in saturated regions or causing near-saturated regions to become saturated. The approach avoids pushing near-saturated colors into saturation by assuring that the total gain applied to a pixel channel is always less than 1. A spatially adaptive clamp threshold is used to clamp color values for a pixel after the color channel color values have been gain-adjusted. In this manner, saturated pixel color values that have been shifted-down into non-saturated regions are clamped to a maximum valid value and are presented as white in images generated from the gain-adjusted image data. One example embodiment may calculate an adaptive clamp threshold for each pixel in the image data. Another example embodiment may calculate an adaptive clamp threshold for each pixel in a row of pixels in the image data.

20 Claims, 9 Drawing Sheets

US 8,767,087 B1

PREVENTING COLOR ARTIFACTS IN OVEREXPOSED REGIONS AND PRESERVING MAXIMUM SIGNALS IN NEAR-OVEREXPOSED REGIONS OF DIGITAL IMAGES

INCORPORATION BY REFERENCE

This disclosure is a continuation of U.S. application Ser. No. 12/570,079, filed on Sep. 30, 2009, now issued as U.S. Pat. No. 8,537,233, which claims priority under 35 U.S.C. §119(e) to U.S. Provisional Application No. 61/105,262, filed on Oct. 14, 2008, and is related to U.S. Non-provisional application Ser. No. 12/481,974, filed on Jun. 10, 2009, which is issued as U.S. Pat. No. 8,471,921 on Jun. 25, 2013. The disclosures of the applications referenced above are incorporated herein by reference in their entireties.

BACKGROUND

Digital image data, generated by a digital imaging device, such as a digital camera or digital scanner, is typically stored as a set of pixels, each pixel including a set of color channel color values. For example, each pixel in a RGB formatted data file may include three color values, i.e., a color value for a red color channel, a color value for a green color channel, and a color value for a blue color channel. Each pixel converted from a Bayer space formatted data file may include four color values, i.e., a color value for a red color channel (R), a color value for a first green color channel (G1), a color value for a second green color channel (G2) and a color value for a blue color channel (B).

Each color channel may support a range of valid color values. For example, a color channel that allows 10 bits for the storage of each color value may support color values within the range of 0 to 1023. For example, in an RGB device that allows 10 bits for the storage of each color value, the electrical signal generated as a result of light impacting a pixel light sensor configured to measure an intensity of a red component of the incident light is translated to a digital value between 0 and 1023 and is stored as a red channel color value associated with the pixel. The electrical signal generated as a result of light impacting a pixel light sensor configured to measure an intensity of a blue component of the incident light is translated to a digital value between 0 and 1023 and is stored as a blue channel color value associated with the pixel. The electrical signal generated as a result of light impacting a pixel light sensor configured to measure an intensity of a green component of the incident light is translated to a digital value between 0 and 1023 and is stored as a green channel color value associated with the pixel. Together, the red, blue and green color channel color values define a pixel color that is determined by the magnitude of the respective RGB color channel color values.

Overexposure and near over-exposure is inevitable in digital images of some high contrast scenes. In high contrast scenes, the electrical signal generated as a result of light impacting one or more pixel light sensors translates to a digital value greater that the maximum allowed digital value, e.g., 1023, that can be stored as a channel value for the pixel. Overexposed pixel channel data is typically represented in the image data with the maximum valid channel value, e.g., 1023. Near-overexposed pixel channel data is typically represented in the image data with a valid channel value that is close to the maximum allowed channel value, e.g., 1023.

Further, digital image data may be degraded by one or more types of distortion. The distortions can include, for example, optical crosstalk, and sensor shading. Optical crosstalk, for reasons described in U.S. Non-provisional application Ser. No. 12/481,974, may cause the center of an image to appear brighter and redder than the surrounding portions of the image, which may appear to be darker and bluer. Sensor shading is the result of pixels closer to the center of an image shading pixels further from the center of the image. Although sensor shading is not wavelength dependent, as is optical crosstalk, sensor shading results in a similar form of radially increasing distortion, i.e., radial falloff, by decreasing the amount of light reaching the pixels in the sensor array at locations further from the center of the image.

As described in greater detail below, improper digital image processing performed to remove these one or more types of distortion may cause unexpected color defects at overexposed regions and/or may cause near-overexposed regions to become saturated. In addition, improper white balance processing, i.e., the process of removing unrealistic color casts, so that objects which appear white in person are rendered white in your photo, may also cause unexpected color defects at overexposed regions and/or may cause near-overexposed regions to become saturated.

SUMMARY

Aspects of this disclosure provide an imaging device, an image processing device, and method of processing an image to perform radial falloff correction, and/or white balance correction without introducing color artifacts in overexposed regions or causing near-overexposed regions to become saturated. The described approach may correct for radial falloff and/or improper white balance in both RGB and Bayer space image data converted to R, G1, G2, B format, and may support a wide range of image processing pipelines despite differences in the radial falloff distortion and/or white balance distortion inherent with the optical sensing unit that generated the digital image data to be processed.

Traditionally, the introduction of color in gain adjusted digital image data has been avoided by making sure that the total gain, i.e., the product of the respective gains applied to the raw image data, is always greater than 1. Using such an approach, saturated color values are not pulled-down into the non-saturated regions where they introduce color artifacts to previously white saturated regions. Instead the saturated color values remain in the saturated region and the saturated regions remain white after a uniform clamping threshold is applied. Unfortunately, such an approach may have the undesirable effect of pulling-up near-saturated colors into saturation resulting in a loss of image detail once the saturated image channels are truncated to white values by the respective channel clamping modules.

The described embodiments avoid pushing near-saturated colors into saturation by assuring that the total gain applied to a pixel channel is always less than 1. For example, in one embodiment that corrects for both radial falloff and color balance, the described approach assures that the radial falloff gain applied to a color channel is less than 1 and that the white balance gain applied to a color channel is less than 1. In another embodiment that corrects for both radial falloff and color balance, the described approach assures that the product of the gain values applied to a color channel is less than 1.

The described embodiments calculate a spatially adaptive clamp threshold that may be used to clamp color values for a pixel after the color channel color values have been gain-adjusted with a total gain less than 1. In this manner, saturated pixel color values that have been shifted-down into non-saturated regions are clamped to a maximum valid value and are presented as white in images generated from the gain-adjusted image data. One example embodiment may calculate an adaptive clamp threshold for each pixel in the image data. Another example embodiment may calculate an adaptive clamp threshold for each pixel in a row of pixels in the image data.

In one example embodiment, an imaging device is described that may include, an optical sensing unit that may generate image data having a plurality of pixels, each pixel having a plurality of color channels, each color channel having a color value, and an image processing unit, that may include, a radial falloff unit that may apply falloff gains to the respective color values of the plurality of color channels associated with a pixel, a clamp threshold unit that may generate a clamp threshold for the color values of the pixel based on total gains applied to the respective color values for the pixel, each total gain based on the falloff gain applied to the respective color value for the pixel, and a clamping unit that may limit the color values for the pixel to the clamp threshold.

In a second example embodiment, an imaging device is described that may include, an optical sensing unit that may generate image data having a plurality of rows of pixels, each pixel in a row of pixels having a plurality of color channels, each color channel having a color value, and an image processing unit, that may include, a radial falloff unit that may apply falloff gains to the respective color values of the plurality of color channels associated with a pixel, a clamp threshold unit that may generate a clamp threshold for the color values of the pixels in a row of pixels based on total gains applied to the respective color values of the respective pixels in the row of pixels, each total gain based on the falloff gain applied to the respective color values of the respective pixels in the row of pixels, and a clamping unit that may limit the color values for the pixels in a row of pixels to the clamp threshold.

In a third example embodiment, a method of processing a digital image is described that may include, generating image data having a plurality of pixels, each pixel having a plurality of color channels, each color channel having a color value, applying falloff gains to the respective color values of the plurality of color channels associated with a pixel, generating a clamp threshold for the color values of the pixel based on total gains applied to the respective color values for the pixel, each total gain based on the falloff gain applied to the respective color value for the pixel, and limiting the color values for the pixel to the clamp threshold.

In a fourth example embodiment, a method of processing a digital image is described that may include, generating image data having a plurality of rows of pixels, each pixel in a row of pixels having a plurality of color channels, each color channel having a color value, applying falloff gains to the respective color values of the plurality of color channels associated with a pixel, generating a clamp threshold for the color values of the pixels in a row of pixels based on total gains applied to the respective color values of the respective pixels in the row of pixels, each total gain based on the falloff gain applied to the respective color values of the respective pixels in the row of pixels, and limiting the color values for the pixels in a row of pixels to the clamp threshold.

BRIEF DESCRIPTION OF THE DRAWINGS

Example embodiments of an imaging device, an image processing device, and a method of processing digital image data to perform radial falloff correction, and/or white balance correction without introducing color artifacts in overexposed regions or causing near-overexposed regions to become saturated will be described with reference to the following drawings, wherein like numerals designate like elements, and wherein.

DETAILED DESCRIPTION OF EMBODIMENTS

Figure 1:
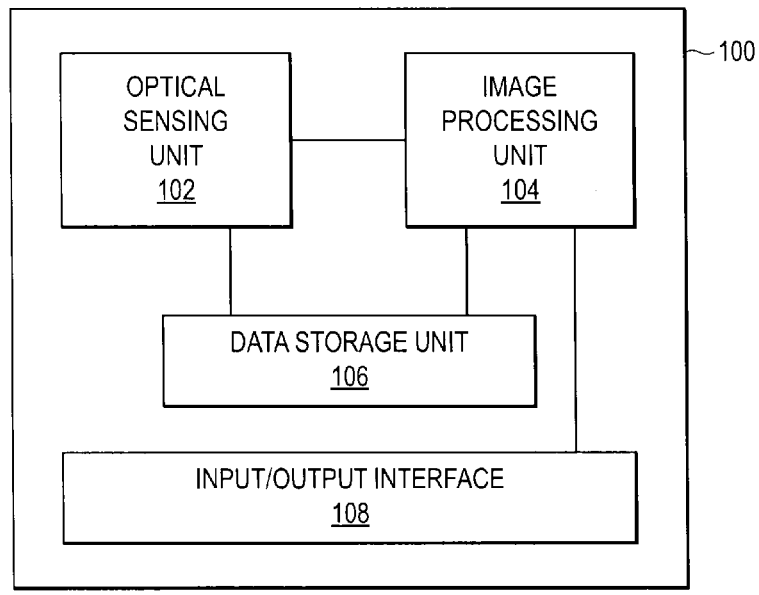
FIG. 1 is a block diagram of an example imaging device that includes an image processing unit that may perform radial falloff correction, and/or white balance correction in digital image data.

FIG. 1 is a block diagram of an example imaging device that includes an image processing unit that may process raw image data generated by an optical sensing unit, e.g., a CMOS array sensor unit, to perform radial falloff correction, and/or white balance correction without introducing artifacts in overexposed regions or causing near-overexposed regions to become saturated. Embodiments of the example imaging device, shown in FIG. 1, may be included in stand-alone digital image cameras, as well as in digital image cameras embedded in other electronic devices, such as cellular phones, laptop computers and hand-held personal computing devices. As shown in FIG. 1, example imaging device 100 may include an optical sensing unit 102, an image processing unit 104, a data storage unit 106 and an input/output interface 108.

In one example embodiment, optical sensing unit 102 may contain one or more fixed and/or adjustable focal length lenses (not shown) that receive light reflected from an object or scene to be photographed and focus the light onto a micro-lens array unit (also not shown) that may contain an array of micro-lenses, each respective micro-lens configured to receive and direct unfiltered light from the fixed and/or adjustable focal length lenses in the direction of a single colored filter element and a single CMOS sensor of a CMOS sensor array. An electrical response signal that corresponds with the intensity of filtered light incident on a CMOS sensor may be converted to a corresponding color channel color value for a corresponding pixel.

For example, in an RGB based embodiment, three individual CMOS sensors, each configured to receive light via red, green and blue color filter elements, respectively, may be associated with a single image pixel, thereby allowing the pixel to capture any color in the color spectrum based on the respective intensities of the respective red, green and blue color filter elements contributing to the pixel. Electrical responses generated by the respective CMOS sensors in the CMOS sensor array may be formatted by a data storage unit interface and stored in data storage unit 106 as raw image files. These raw image files may be retrieved via input/output interface 108 for viewing via a display integrated within the imaging device embodiment, or may be retrieved for transfer to another device, such as a personal computer, for long-term storage, viewing/printing and/or editing.

Figure 2:
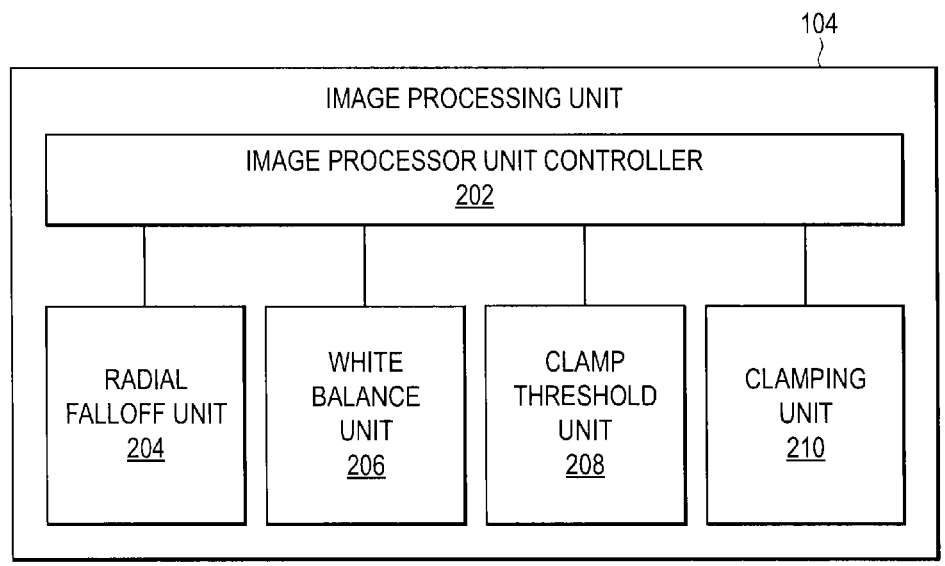
FIG. 2 is a block diagram of an example image processing unit introduced in FIG. 1.

FIG. 2 is a block diagram of an example embodiment of image processing unit 104. As shown in FIG. 2, an example embodiment of image processing unit 104 may include, an image processor unit controller 202, a radial falloff unit 204, a white balance unit 206, a clamp threshold unit 208, and a clamping unit 210. Raw image files may be retrieved by image processing unit 104 from data storage unit 106 for processing that reduces the effect of radial falloff, and/or for processing that applies white balance correction, without introducing artifacts in overexposed regions or causing near-overexposed regions to become saturated. The revised image data may then again be stored to data storage unit 106.

In operation, image processor unit controller 202 may maintain a workflow state machine, and/or control parameters that allow each of the respective units described below to perform its assigned task. For example, image processor unit controller 202 may maintain a status list of which raw image files stored in data storage unit 106 have been processed to reduce the effect of radial falloff, and/or to correct white balance, in the raw image data. Further, as raw image data associated with each image is processed by the respective units described below, image processor unit controller 202 may receive status updates from the respective units so that image processor unit controller 202 may coordinate the actions of the respective units in performing subsequent processing of the image data.

Example processes that may be executed by/coordinated by image processor unit controller 202 to reduce the effect of optical crosstalk and radial falloff errors in the raw image data are described below with respect to FIG. 3 and FIG. 4. The individual roles of the processing units shown in FIG. 2 with respect to those processes are described below.

Radial falloff unit 204 may be used to determine a radial falloff gain for each color channel associated with a selected pixel at a specific location in an image, based on a set of predetermined radial falloff characteristics for each color channel. As addressed in greater detail with respect to FIG. 5, below, the radial falloff is non-linear, spatially varied, and differs for each color channel. The radial falloff characteristics of image data color channels produced by optical sensing unit 102 may be determined using off-line techniques. Radial falloff gain values required to compensate individual color channels at a specific pixel may also be predetermined based on the radial falloff characteristics of the optical sensing unit 102. These predetermined radial falloff gain values may be stored for later retrieval and use by radial falloff unit 204 to correct radial falloff distortion at individual pixels in an image.

White balance unit 206 may calculate a white balance channel gain, or channel gain, for each color channel in the digital image. The calculated channel gains may differ for each color channel, but may remain constant over the entire digital image. Application of the white balance channel gain compensates the color channels to remove unrealistic color casts, so that objects in the digital image are represented with color values that more closely match the actual color of the objects and so that white objects appear white in the digital image.

Clamp threshold unit 208 may calculate a spatially adaptive clamp threshold that may be used to clamp color channel color values for a pixel after the color channel color values have been gain adjusted. As described in greater detail below with respect to FIG. 3, one example embodiment of clamp threshold unit 208 may calculate an adaptive clamp threshold for each pixel in the image data. As described in greater detail below with respect to FIG. 4, another example embodiment of clamp threshold unit 208 may calculate an adaptive clamp threshold for each row of pixels in the image data.

For example, the process flow described below with respect to FIG. 3, at step S318, generates an adaptive clamp threshold that corresponds to equation 1, below.

$$PCT = MIN(CVR_{MAX} * R_{TCG}, CVR_{MAX} * G_{TCG}, CVR_{MAX} * B_{TCG}) \quad \text{EQ 1}$$

Where PCT is the clamp threshold value for a selected pixel;

MIN( ) is a function that selects the minimum value from a set of values;

$CVR_{MAX}$ is the maximum valid color value in a color channel value range, e.g. 1023;

$R_{TCG}$ is the total color gain for the red color channel at the selected pixel;

$G_{TCG}$ is the total color gain for the red color channel at the selected pixel; and $B_{TCG}$ is the total color gain for the red color channel at the selected pixel.

It is noted that black level may be subtracted before radial falloff and channel gain. Therefore, $CVR_{MAX}$ in the above equation can be adjusted for black-level by subtracting the black level from the maximum valid color value in a color channel value range. For example, assuming the maximum valid color value in a color channel value range is 1023, $CVR_{MAX} = 1023 - \text{blacklevel}$.

The process flow described below with respect to FIG. 4, at step S418, generates an adaptive clamp threshold that corresponds to equation 2, below.

$$RCT = MIN(PCT_1, PCT_2, PCT_3, \ldots PCT_N) \quad \text{EQ 2}$$

Where $R_{CT}$ is the clamp threshold value for a selected row of pixels;

MIN( ) is a function that selects the minimum value from a set of values; and $PCT_{(1...N)}$ is the clamp threshold value for each respective pixel in the selected row.

Clamping unit 210 may apply the adaptive clamp threshold generated by clamp threshold unit 208 to color channel color values for one or more pixels. For example, in an image processing unit configured to apply an adaptive clamp threshold to each individual pixel, such as an image processing unit that supports the process flow described below with respect to FIG. 3, clamping unit 210 may apply a newly generated adaptive clamp threshold, e.g., generated in a manner consistent with equation 1, to the gain-adjusted color values of each pixel in the image data. However, in an image processing unit configured to apply a common adaptive clamp threshold to all pixels in a selected row, such as an image processing unit that supports the process flow described below with respect to FIG. 4, clamping unit 210 may apply a newly generated adaptive clamp threshold, e.g., generated in a manner consistent with equation 2, to the gain-adjusted color values of each pixel in a selected row of image data.

Figure 3:
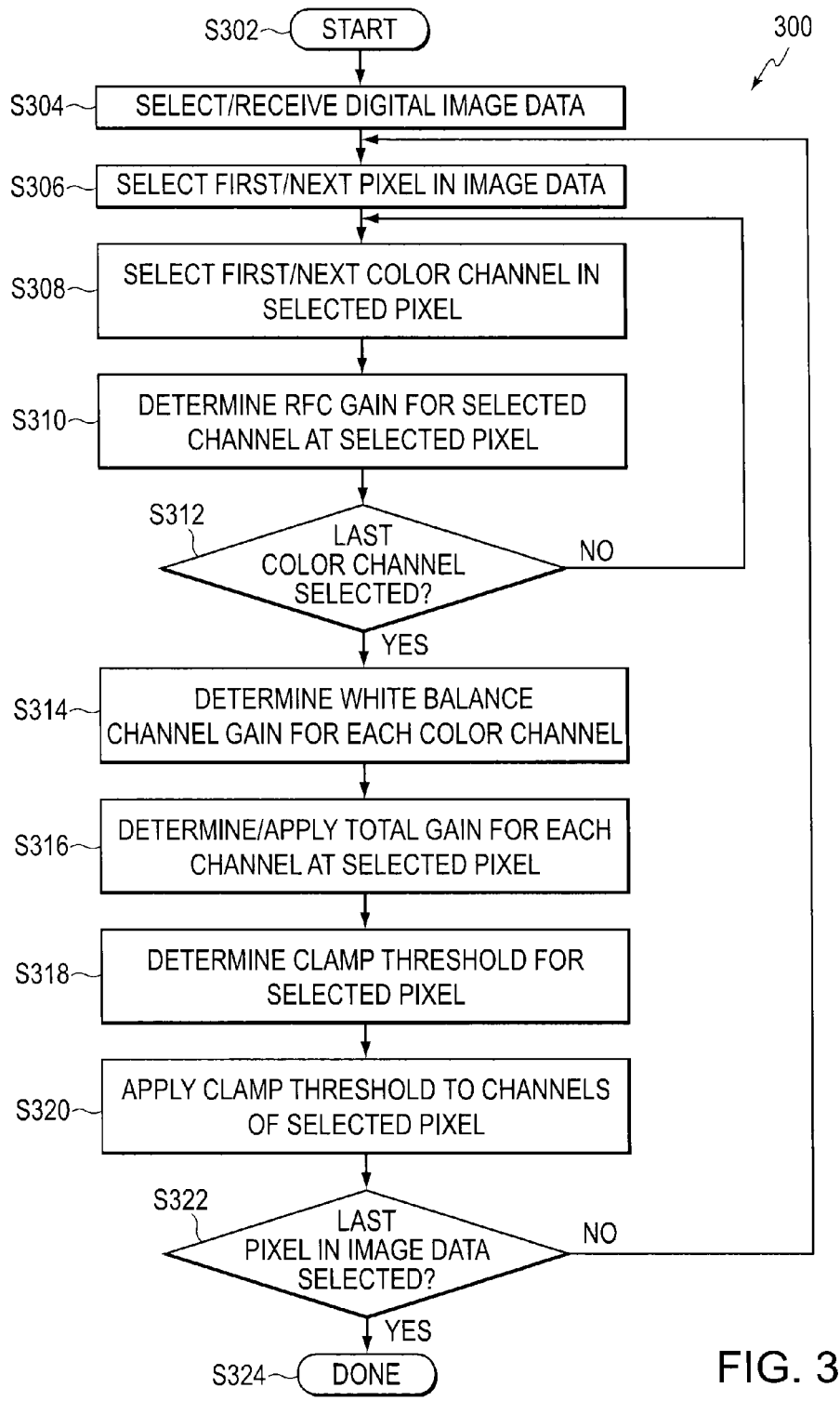
FIG. 3 shows a flow-chart of a first example process that may be performed by an example imaging device or example image processing device to perform radial falloff correction, and/or white balance correction in digital image data.

FIG. 3 shows a flow-chart of a first example process that may be performed by an example imaging device or example image processing device to perform radial falloff correction, and/or white balance correction in digital image data. As shown in FIG. 3, operation of process 300 begins at step S302 and proceeds to step S304.

In step S304, image processor unit controller 202 may select/receive a set of digital image data, and operation of the process continues to step S306.

In step S306, image processor unit controller 202 may select a first/next pixel in the digital image data, and operation of the process continues to step S308.

In step S308, image processor unit controller 202 may select a first/next color channel associated with the selected pixel, and operation of the process continues to step S310.

In step S310, image processor unit controller 202 may invoke radial falloff unit 204 to determine a radial falloff correction gain for the selected channel at the selected pixel, and operation of the process continues to step S312.

If, in step S312, image processor unit controller 202 determines that the last color channel associated with the selected pixel has already been selected, operation of the process continues to step S314, otherwise, operation of the process continues to step S308.

In step S314, image processor unit controller 202 may invoke white balance unit 206 to determine a white balance channel gain for each color channel associated with the selected digital image, and operation of the process continues to step S316.

In step S316, image processor unit controller 202 may determine and apply to each color channel the channel total gain, i.e., the product of the radial falloff correction gain determined for each color channel at step S310 and the white balance channel gain determined for each color channel at step S314, and operation of the process continues to step S318.

In step S318, image processor unit controller 202 may invoke clamp threshold unit 208 to generate a clamp threshold for the selected pixel, e.g., based on equation 1, and operation of the process continues to step S320.

In step S320, image processor unit controller 202 may invoke clamping unit 210 to apply the clamp threshold to the gain-adjusted color values of the selected pixel, and operation of the process continues to step S322.

If, in step S322, image processor unit controller 202 determines that the last pixel in the image data has been selected and processed, the process continues to step S324 and the process terminates; otherwise, operation of the process continues to step S306.

Figure 4:
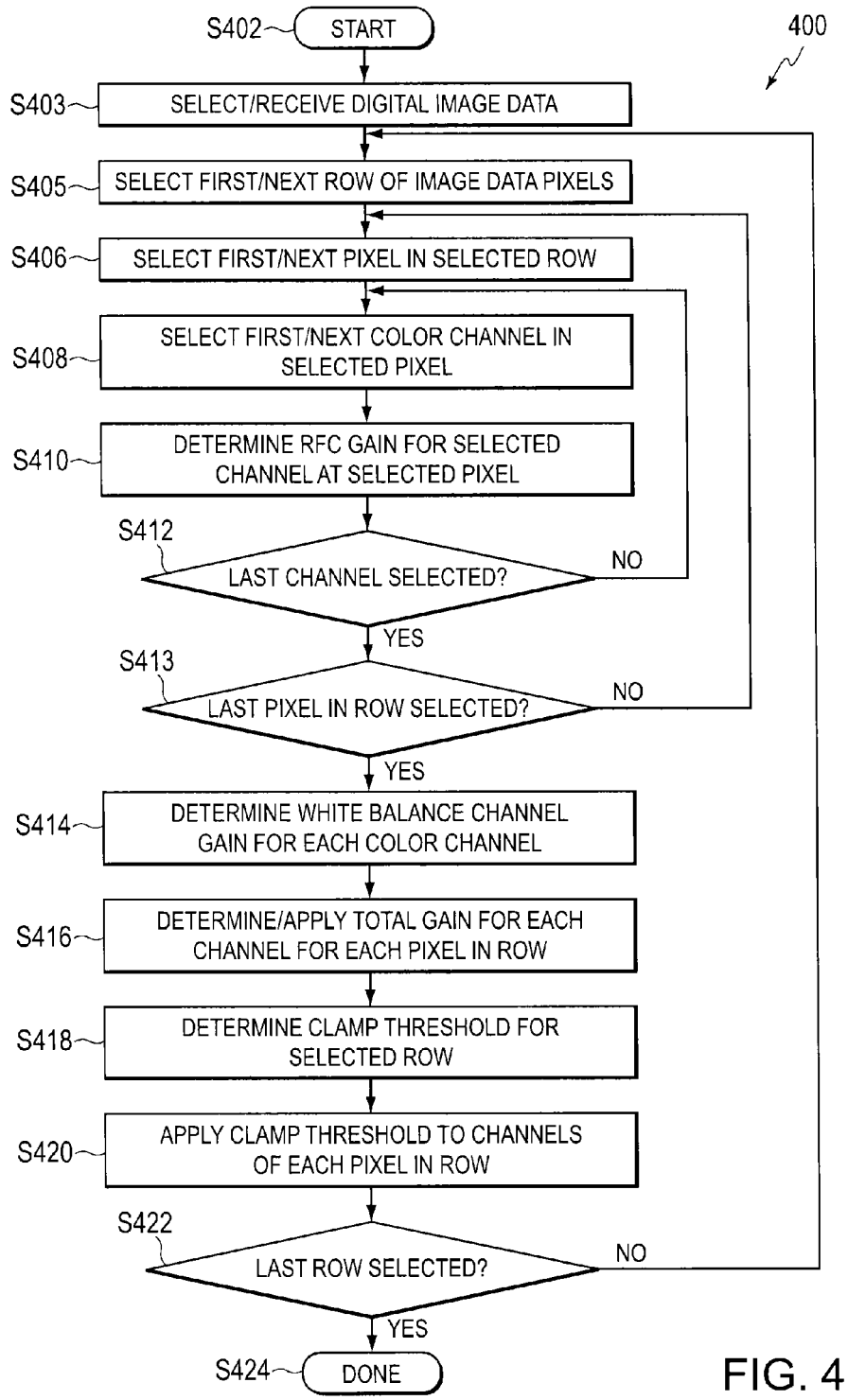
FIG. 4 shows a flow-chart of a second example process that may be performed by an example imaging device or example image processing device to perform radial falloff correction, and/or white balance correction in digital image data.

FIG. 4 shows a flow-chart of a second example process that may be performed by an example imaging device or example image processing device to perform radial falloff correction, and/or white balance correction in digital image data. The process described with respect to FIG. 4 differs with respect to the process described above with respect to FIG. 3, in that a clamp threshold is calculated for all pixels in a selected row of pixels, e.g., based on equation 2, described above, and the clamp threshold is applied to the gain-adjusted color values of each pixel in a selected row of image data. As shown in FIG. 4, operation of process 400 begins at step S402 and proceeds to step S404.

In step S404, image processor unit controller 202 may select/receive a set of digital image data, and operation of the process continues to step S405.

In step S405, image processor unit controller 202 may select a first/next row of image data pixels, and operation of the process continues to step S406.

In step S406, image processor unit controller 202 may select a first/next pixel in the selected row, and operation of the process continues to step S408.

In step S408, image processor unit controller 202 may select a first/next color channel associated with the selected pixel, and operation of the process continues to step S410.

In step S410, image processor unit controller 202 may invoke radial falloff unit 204 to determine a radial falloff correction gain for the selected channel at the selected pixel, and operation of the process continues to step S412.

If, in step S412, image processor unit controller 202 determines that the last color channel associated with the selected pixel has already been selected, operation of the process continues to step S413, otherwise, operation of the process continues to step S408.

If, in step S413, image processor unit controller 202 determines that the last pixel in the selected row of digital image data has already been selected and processed, operation of the process continues to step S414, otherwise, operation of the process continues to step S406.

In step S414, image processor unit controller 202 may invoke white balance unit 206 to determine a white balance channel gain for each color channel associated with the selected digital image, and operation of the process continues to step S416.

In step S416, image processor unit controller 202 may determine and apply to each color channel of each pixel in the selected row the channel total gain for the color channel, i.e., the product of the radial falloff correction gain determined for the color channel at step S410 and the white balance channel gain determined for each color channel at step S414, and operation of the process continues to step S418.

In step S418, image processor unit controller 202 may invoke clamp threshold unit 208 to generate a clamp threshold for the selected row of pixels, e.g., based on equation 2, and operation of the process continues to step S420.

In step S420, image processor unit controller 202 may invoke clamping unit 210 to apply the clamp threshold to the gain-adjusted color values of each pixel, and operation of the process continues to step S422.

If, in step S422, image processor unit controller 202 determines that the last row of image data pixels has been selected and processed, the process continues to step S424 and the process terminates; otherwise, operation of the process continues to step S405.

It is noted that embodiments of the image processing approach described above with respect to FIG. 1 through FIG. 4, avoid pushing near-saturated colors into saturation by assuring that the total gain applied to a pixel channel is always less than 1, e.g., by assuring that the radial falloff gain applied to a color channel is less than 1, and assuring that the white balance gain applied to a color channel is less than 1, and/or by assuring that the product of the selected radial falloff gain and the selected white balance gain applied to a color channel is less than 1.

Figure 5:
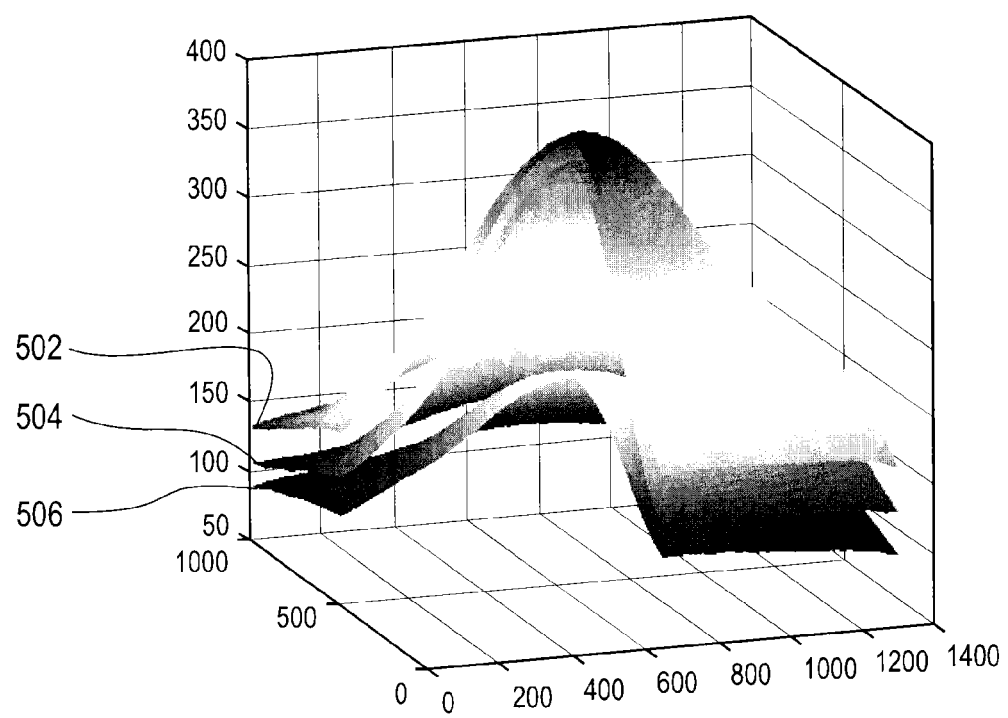
FIG. 5 shows a three dimensional plot representing the effects of radial falloff on color channel color values for red, green and blue sensors positioned at different locations relative to the center of a digital image.

FIG. 5 is a three dimensional plot representing the effects of radial falloff on color channel color values for red, green and blue sensors positioned at different locations relative to the center of a digital image. In FIG. 5, the red color channel radial falloff curve is shown at 502, the green color channel radial falloff curve is shown at 504, and the blue color channel radial falloff curve is shown at 506. As shown in FIG. 5, each color channel, e.g., red channel, green channel, and blue channel, associated with a digital image has a different radial falloff for the same pixel. Further, the radial falloff for each of the color channels is dependent on the location of the pixel in the image. In general, the radial falloff for each of the color channels is the least at the center of the image and increases non-linearly for each color channel at pixel locations approaching the perimeter of the image.

Based on the color channel radial falloff curves shown in FIG. 5, it is clear that to compensate for color channel radial falloff, the radial falloff curve gain adjustment must be greater for pixels approaching the perimeter of the image, and less for pixels approaching the center of the image. Radial falloff correction gain values may be pre-calculated off-line for an optical sensing unit in advance of the image correction process described above with respect to FIG. 3 and FIG. 4. The predetermined radial falloff correction gain values may be stored for each color channel for each x/y pixel associated with digital image data generated by the optical sensing unit. Using such an approach, radial falloff unit 204, as described above with respect to FIG. 2, FIG. 3, at step S310, and FIG. 4, at step S410, may determine the radial falloff gain for a selected color channel for a selected pixel by accessing the stored radial falloff correction gain values based on the color of the selected color channel and the x/y coordinates of the selected pixel.

Figure 6:
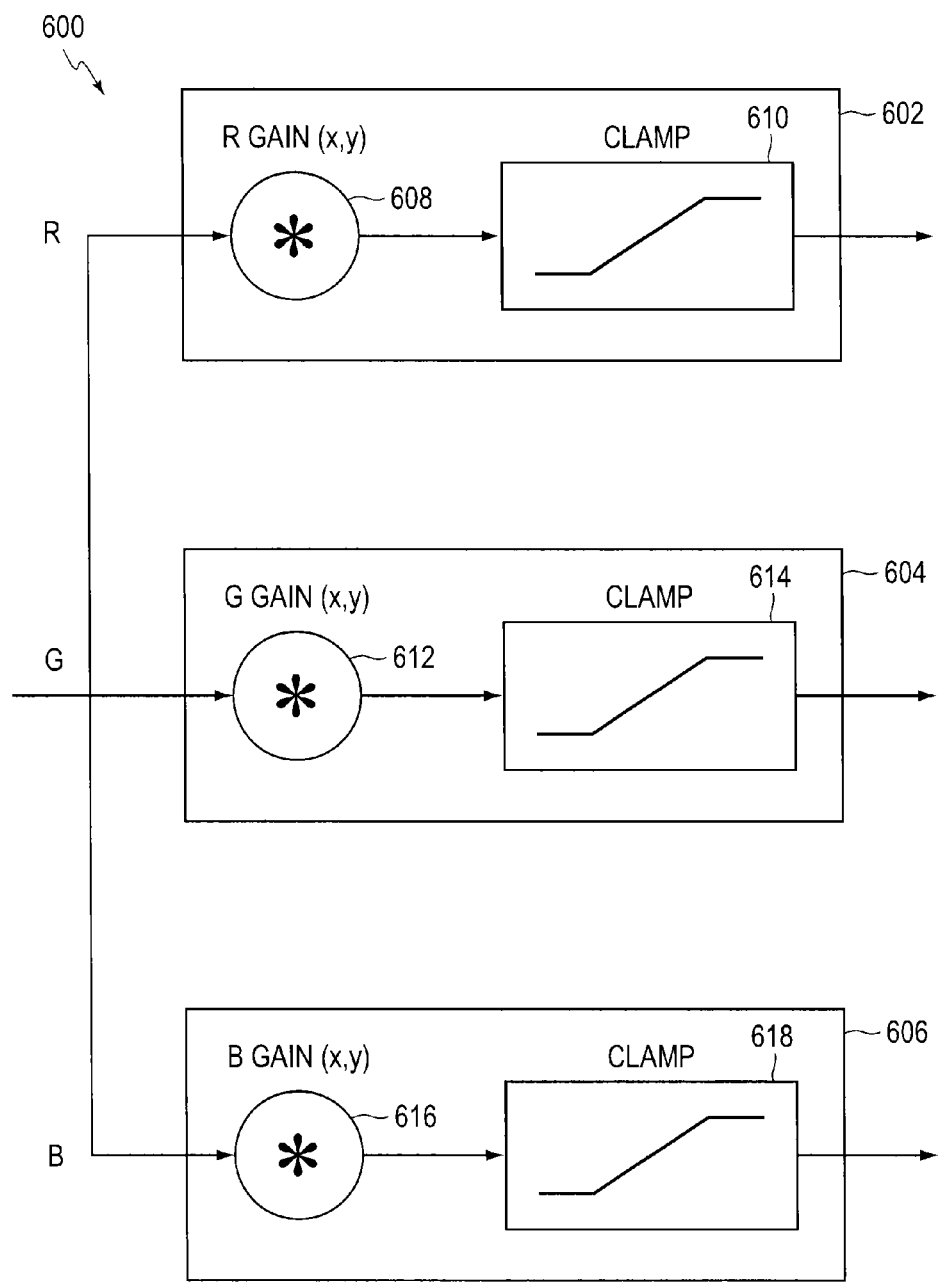
FIG. 6 is a schematic representation of an image processing pipeline used to perform radial falloff correction, and/or white balance correction in digital image data.

FIG. 6 is a schematic representation of an example image processing pipeline 600 used to perform radial falloff correction, and/or white balance correction in generated images. As shown in FIG. 6, such an image processing pipeline 600 may include a red channel processing path 602, a green channel processing path 604, and a blue channel processing path 606. Red channel processing path 602 may include a red channel gain module 608 and a red channel clamping module 610, the green channel processing path 604 may include a green channel gain module 612 and a green channel clamping module 614, and the blue channel processing path 606 may include a blue channel gain module 616 and a blue channel clamping module 618.

Image processing pipeline 600 is a generic model that may be used to produce different corrected image results, depending on the manner in which the respective channel processing paths are implemented, as described below with respect to FIG. 7 through FIG. 19. Red channel gain module 608, green channel gain module 612, and blue channel gain module 616 may each apply a total channel gain that is a cumulative gain, i.e., the product of multiple gain adjustments applied to the color channel color values to correct image distortions due to, for example, radial falloff and improper white balance. Specific image results due to changes in the magnitude and characteristics of the total channel gain applied to the respective color channels of an image are described in detail below with respect to FIG. 7 through FIG. 19.

Red channel clamping module 610, green channel clamping module 614, and blue channel clamping module 618 may each clamp the gain-adjusted color values output by their respective channel gain modules to a maximum color value allowed by the valid color value range, e.g., 1023 in an allowed range of 0-1023, as described above. Specific image results due to changes in the magnitude and characteristics of the respective clamp thresholds applied to the respective gain-adjusted color channels of an image are also described in detail below with respect to FIG. 7 through FIG. 19.

Figure 7:
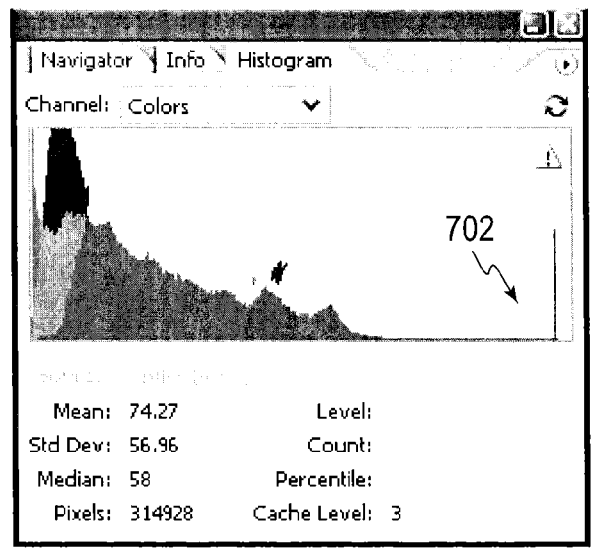
FIG. 7 is a color histogram of example digital image data prior to applying a channel gain.
Figure 8:
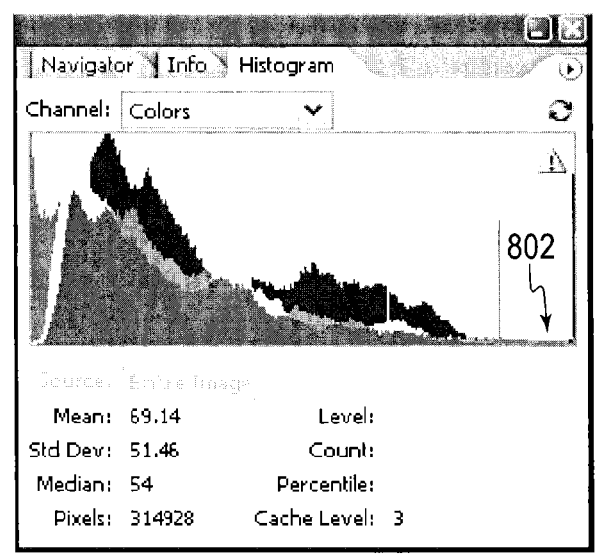
FIG. 8 is a color histogram of example digital image data after applying a channel gain.

FIG. 7 is a color histogram of example digital image data prior to applying gains to the respective color channels in the image data. FIG. 8 is a color histogram of example digital image data after applying a total gain of less than 1.0 to each of the respective color channels in the image data. Color histogram of FIG. 8 shows the impact of applying a total gain of (0.8, 0.5, 0.7) to the red channel, green channel and blue channel of the image data, respectively. Prior to application of the gains, saturated regions of the digital image data in FIG. 7 have color values of (1.0, 1.0, and 1.0). However, after applying total gains of (0.8, 0.5, 0.7) to the red channel, green channel and blue channel, respectively, saturated regions of the digital image data in FIG. 8 have color values of (0.8, 0.5, 0.7). Such a change in the saturated region color values can introduce color artifacts, e.g., red, blue and green hues, to the previously white, saturated regions. Such color artifacts in the previously saturated regions are due to an improper conversion of previously saturated color values, i.e., white pixels, to unsaturated color values, i.e., non-white pixels. For example, a comparison of region 702 of the color histogram of FIG. 7 with region 802 of the color histogram of FIG. 8, shows that previously saturated values in region 702 in FIG. 7 have been pulled-back from the saturated region and now reside in the unsaturated region of the histogram of FIG. 8.

Figure 9:
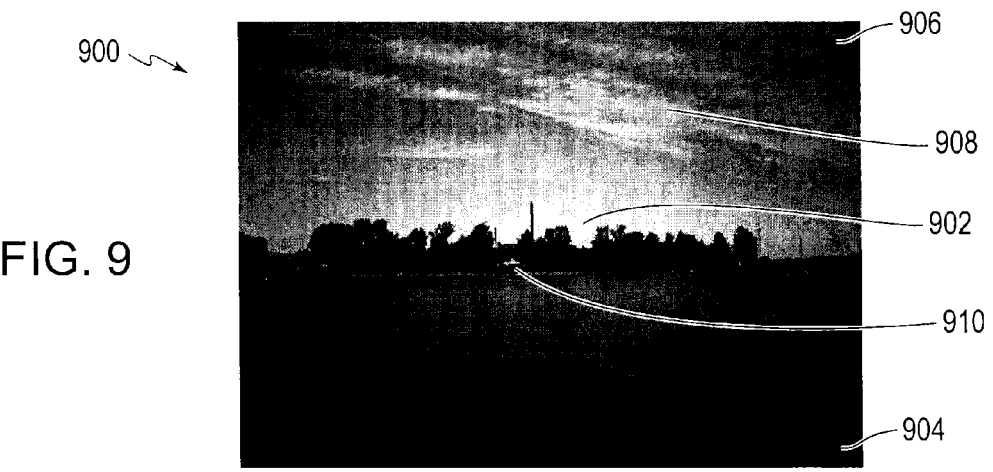
FIG. 9 is an example image prior to the application of radial falloff correction or white balance channel gain.

FIG. 9 is an example image 900 prior to the application of radial falloff correction or white balance channel gain. As such, the image data represented in image 900 suffers from radial falloff and white balance color distortion characteristic of the optical sensing unit that generated the image data under the lighting conditions encountered at the photographed location. For example, radial falloff distortion is evident in that the image appears unnaturally bright at the center of the image, e.g., at 902, and the image appears to be unnaturally dark towards the periphery of the image, e.g., at lower right periphery 904 and at upper right periphery 906. Further, white balance color distortion is evident in that the white clouds at 908 and the white building at 910 are shown to have an off-white hue.

Figure 10:
FIG. 10 is the image of FIG. 9 after the application of radial falloff correction but prior to the application of white balance channel gain.

FIG. 10 is a copy of the image presented in FIG. 9 after the application of radial falloff correction, but prior to the application of white balance channel gain. As a result, the radial falloff distortion described above with respect to image 900 is no longer present in image 1000. Image 1000 is not unnaturally bright at the center of the image, e.g., at 1002, and the image does not appear to be unnaturally dark towards the periphery of the image, e.g., at lower right periphery 1004 and at upper right periphery 1006. However, white balance color distortion remains evident in image 1000 in that the white clouds at 1008 and the white building at 1010 remain presented in a slightly lighter off-white hue.

Figure 11:
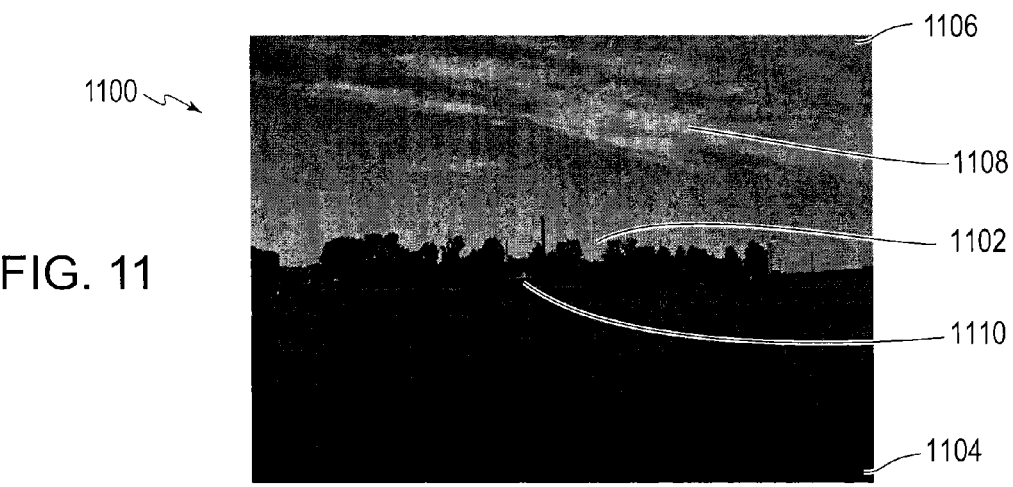
FIG. 11 is the image of FIG. 9 after the application of radial falloff correction and white balance channel gain.

FIG. 11 is a copy of the image presented in FIG. 9 after the application of radial falloff correction, and after the application of white balance channel gain. As a result, the radial falloff distortion described above with respect to image 900 is no longer present in image 1100. Further, as a result the application of white balance channel gain, the clouds at 1108 and the building at 1110 are white, and the image enjoys more natural looking color tones throughout the image.

It is noted that the application of radial falloff correction and white balance channel gains does not appear to have introduced color artifacts into saturated regions of the image. However, as addressed below with respect to FIG. 12 through FIG. 18, such is not always the result.

Figure 12:
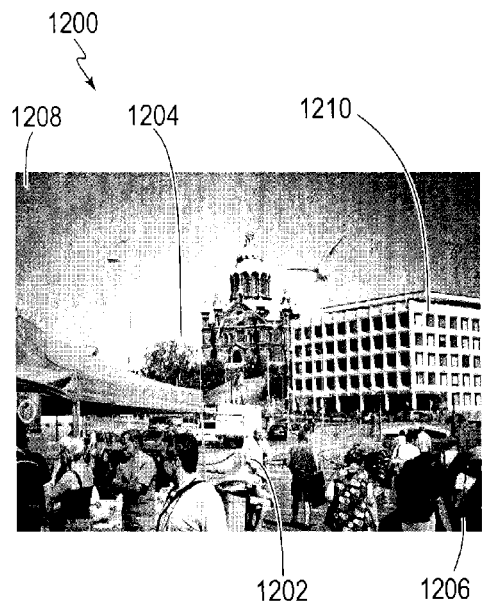
FIG. 12 is a second example image prior to the application of radial falloff correction or white balance channel gain.

FIG. 12 is an example image 1200 prior to the application of radial falloff correction or white balance channel gain. As such, the image data represented in image 1200 suffers from radial falloff and white balance color distortion characteristic of the optical sensing unit that generated the image data under the lighting conditions encountered at the scene photographed. For example, radial falloff distortion is evident in that the image appears unnaturally bright at the center of the image, e.g., at 1204, and the image appears to be unnaturally dark towards the periphery of the image, e.g., at lower right periphery 1206 and at upper left periphery 1208. Further, white balance color distortion is evident in that the white building at 1210 is presented with an off-white hue. In addition, image 1200 includes a saturated region at 1202, identifiable in that it is one of only several portions of the image that are bright white.

Figure 13:
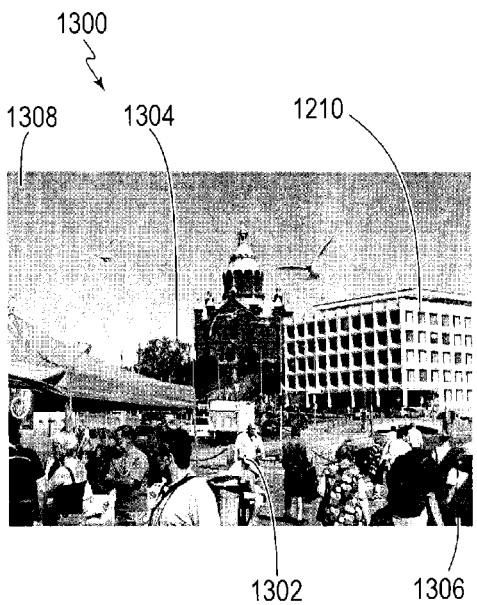
FIG. 13 is the image of FIG. 12 after the application of radial falloff correction but prior to the application of white balance channel gain.

FIG. 13 is a copy of the image shown in FIG. 12 to which radial falloff correction has been applied but to which white balance channel gain has not been applied. As such, the image no longer appears unnaturally bright at the center of the image, e.g., at 1304, and the image no longer appears to be unnaturally dark towards the periphery of the image, e.g., at lower right periphery 1306 and at upper left periphery 1308. However, the presence of white balance color distortion remains evident in that the white building at 1310 is presented with a greenish off-white hue. In addition, image 1300 as a result of applying a radial falloff gain less than 1.0, as described above with respect to FIG. 7 and FIG. 8, the saturated color values at 1302 have been pulled back, resulting in the introduction of a color artifact, i.e., a pink hue, in the previously saturated region.

Figure 14:
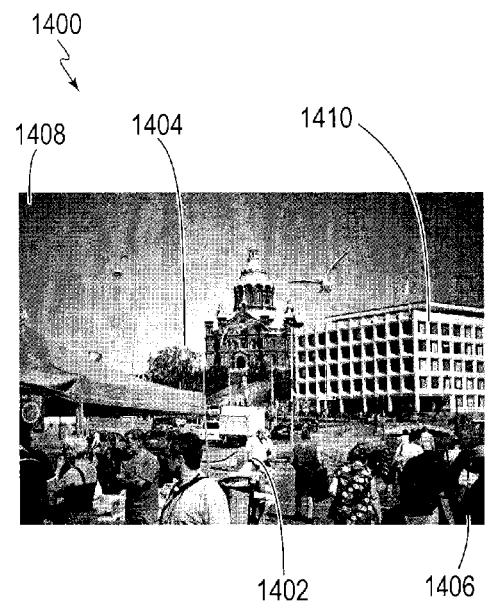
FIG. 14 is the image of FIG. 12 after the application of white balance channel gain, but prior to the application of radial falloff correction.

FIG. 14 is a copy of the image shown in FIG. 12 to which a white balance channel gain correction has been applied, but to which a radial falloff correction gain has not been applied. As such, the image remains unnaturally bright at the center of the image, e.g., at 1404, as well as unnaturally dark towards the periphery of the image, e.g., at lower right periphery 1406 and at upper left periphery 1408. However, the color balance has been somewhat improved across the image, with the white building at 1410 being presented with a blue, rather than green off-white hue. As in image 1300, image 1400, as a result of applying a radial falloff gain less than 1.0, as described above with respect to FIG. 7 and FIG. 8, the saturated color values at 1402 have been pulled back, again resulting in the introduction of a color artifact, i.e., a pink hue, in the previously saturated region.

Figure 15:
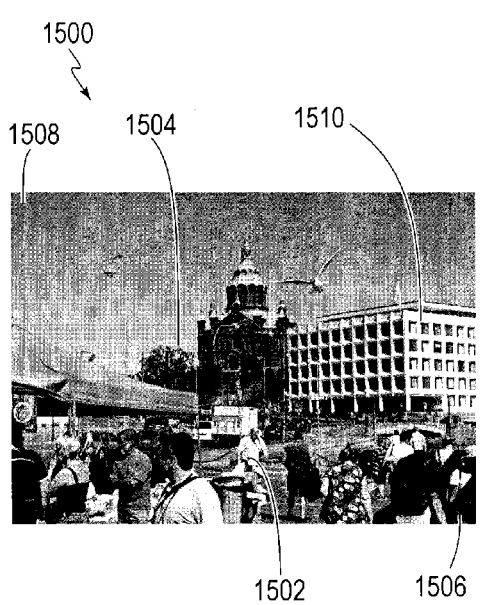
FIG. 15 is the image of FIG. 12 after the application of radial falloff correction and white balance channel gain.

FIG. 15 is a copy of the image shown in FIG. 12 to which both white balance channel gain correction and radial falloff correction gain have been applied. As such, the image no longer appears unnaturally bright at the center of the image, e.g., at 1504, and the image no longer appears to be unnaturally dark towards the periphery of the image, e.g., at lower right periphery 1506 and at upper left periphery 1508. Further, the color balance has been significantly improved across the image, with the white building at 1510 has finally achieved a proper white tone. However, as in image 1300 and image 1400, as a result of applying total gain less than 1, i.e., in which the product of the white balance channel gain and the radial falloff gain is less than 1, as described above with respect to FIG. 7 and FIG. 8, the saturated color values at 1502 have again been pulled back, resulting in the introduction of a color artifact, i.e., a pink hue, in the previously saturated region.

FIG. 7 and FIG. 8, as well as FIG. 13, FIG. 14 and FIG. 15, demonstrate that the image processing pipeline described above with respect to FIG. 6 is capable of introducing a color artifact into saturated regions of a raw digital image file whenever the total gain applied by one or more of the channel gain modules is less than 1. The reason for this, as described with respect to FIG. 8, is that one or more previously saturated color values in the raw image data are pulled-down into the non-saturated pool of color, resulting in the application of a non-white hue to the previously saturated regions.

Traditionally, such color artifacts have been avoided by making sure that the total gain, i.e., the product of the respective gains applied to the raw image data, is always greater than 1. Using such an approach, rather than pulling saturated color values down into the non-saturated regions, saturated color values remain in the saturated region, and once the respective channel clamps are applied to clamp the color values to a maximum allowed color value, the saturated colors are again represented as white in generated images based on the clamped, gain-adjusted image data. Unfortunately, such an approach may have the affect of pulling-up near-saturated colors into saturation resulting in a loss of image detail once the saturated image channels are truncated to white values by the respective channel clamping modules.

Embodiments of the image processing approach described above with respect to FIG. 1 through FIG. 4, avoid pushing near-saturated colors into saturation by assuring that the total gain applied to a pixel channel is always less than 1, e.g., by assuring that the radial falloff gain applied to a color channel is less than 1, and assuring that the white balance gain applied to a color channel is less than 1, and/or by assuring that the product of the selected radial falloff gain and the selected white balance gain applied to a color channel is less than 1.

Figure 16:
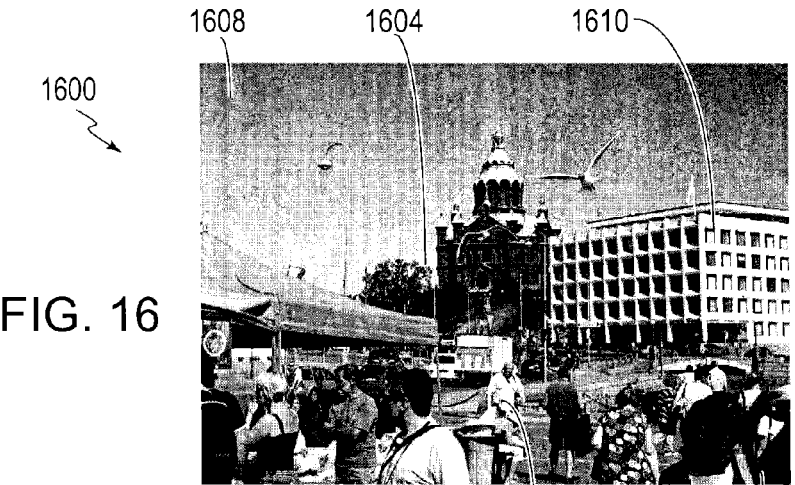
FIG. 16 is the image of FIG. 12 after the application of a small total gain that results in "pull-back" that introduces a color artifact in previously overexposed regions.

FIG. 16 is a copy of the image shown in FIG. 12 to which both white balance channel gain correction and radial falloff correction gain have been applied using a small total gain, i.e., a gain less than 1, that results in "pull-back" and the introduction a color artifact in previously overexposed regions. As such, the image no longer appears unnaturally bright at the center of the image, e.g., at 1604, and the image no longer appears to be unnaturally dark towards the periphery of the image, e.g., at lower right periphery 1606 and at upper left periphery 1608. Further, the color balance has been significantly improved across the image, with the white building at 1610 achieving a proper white tone. In image 1600, as a result of applying total gain less than 1, i.e., in which the product of the white balance channel gain and the radial falloff gain is less than 1, as described above with respect to FIG. 7 and FIG. 8, the integrity of near-saturated channels in the original image data has been preserved; however, the saturated color values at 1602 and other regions have again been pulled back, resulting in the introduction of a color artifact in the previously white saturated region.

Figure 17:
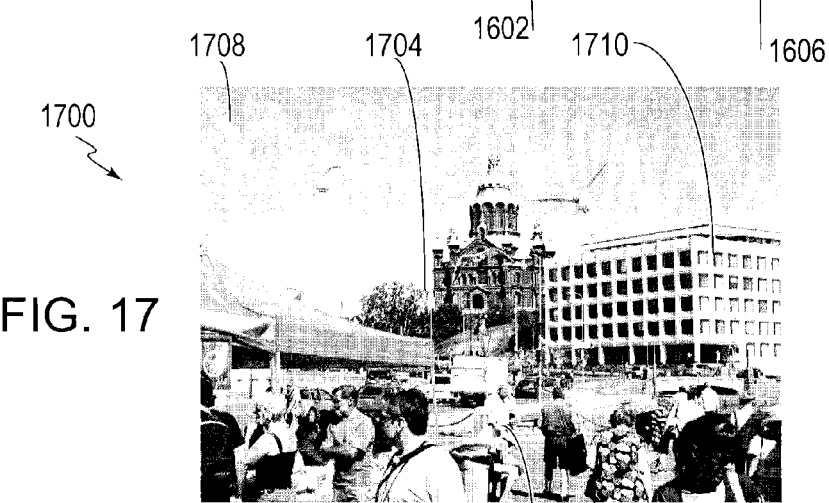
FIG. 17 is the image of FIG. 12 after the application of a large total gain that does not result in "pull-back" but that saturates previously near-overexposed regions.

FIG. 17 is a copy of the image shown in FIG. 12 to which both white balance channel gain correction and radial falloff correction gain have been applied using a large total gain, i.e., a gain greater than 1, that does not result in "pull-back." As such, the image no longer appears unnaturally bright at the center of the image, e.g., at 1704, and the image no longer appears to be unnaturally dark towards the periphery of the image, e.g., at lower right periphery 1706 and at upper left periphery 1708. Further, the color balance has been significantly improved across the image, with the white building at 1710 achieving a proper white tone. However, as a result of applying a total gain greater than 1, i.e., in which the product of the white balance channel gain and the radial falloff gain is greater than 1, as described above with respect to FIG. 7 and FIG. 8, saturated color values at 1702 remain saturated and the region remains white. Unfortunately, by applying a total gain greater than 1, near-saturated channels in the original image data have been pushed into saturation and truncated to a white value, resulting in a loss of image detail.

Figure 18:
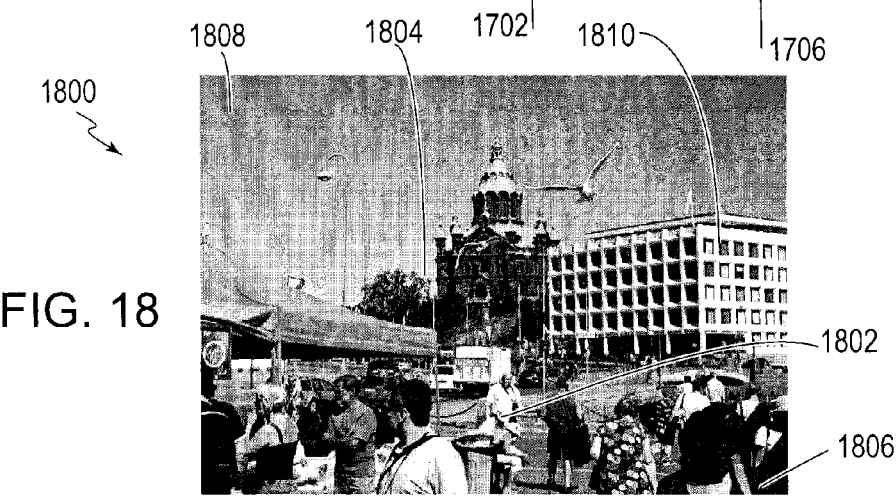
FIG. 18 is the image of FIG. 12 after the application of a small total gain and a spatially adaptive clamping threshold, that does not result in "pull-back," and that retains detail, i.e., does not saturate, near-overexposed regions.

FIG. 18 is a copy of the image shown in FIG. 12 which has been processed to correct white balance and radial falloff using a small total gain, i.e., a gain less than 1, as described above with respect to FIG. 16. However, in processing FIG. 18, a spatially adaptive clamping threshold was used, as described above with respect to FIG. 1 though FIG. 4, equation 1 and equation 2 to avoid the introduction of color artifacts in previously overexposed regions, as shown in FIG. 16 at 1602. Using such techniques, radial falloff and improper white balance have been corrected, while preserving the integrity of near-saturated channels in the original image data, e.g., at 1812 and 1814, and without introducing a color artifact in the previously white saturated region, e.g., at 1802.

It is noted that the described imaging device, image processing device, and method of processing an image may be used to support image processing pipelines despite differences in the radial falloff distortion and/or white balance distortion inherent with the optical sensing unit that generates the digital image data to be processed.

For purposes of explanation in the above description, numerous specific details are set forth in order to provide a thorough understanding of the described imaging device, image processing device, and method of processing an image to perform radial falloff correction, and/or white balance correction without introducing artifacts in overexposed regions or causing near-overexposed regions to become saturated. It will be apparent, however, to one skilled in the art that the described imaging device, image processing device, and method of processing an image may be practiced without these specific details. In other instances, well-known structures and devices are shown in block diagram form in order to avoid obscuring the features of the described imaging device, image processing device, and method of processing an image.

While the imaging device, image processing device, and method of processing an image have been described in conjunction with the specific embodiments thereof, it is evident that many alternatives, modifications, and variations will be apparent to those skilled in the art. Accordingly, embodiments of the imaging device, image processing device, and method of processing an image, as set forth herein, are intended to be illustrative, not limiting. There are changes that may be made without departing from the spirit and scope of the invention.

What is claimed is:

1. An imaging device, comprising:
    a radial falloff unit configured to apply falloff gains to respective color values of a plurality of color channels associated with a pixel;
    a clamp threshold unit configured to generate a clamp threshold based on a minimum value of a set of values for the color values of the pixel, the color values of the pixel being based on total gains applied to the respective color values for the pixel, each total gain based on the falloff gains applied to the respective color values for the pixel; and
    a clamping unit configured to limit the color values for the pixel to the clamp threshold.

2. The imaging device of claim 1, further comprising:
    an optical sensing unit configured to generate an image having a plurality of pixels, each pixel having the plurality of color channels, each color channel having a color value.

3. The imaging device of claim 1, wherein the clamp threshold has different values within an image including the plurality of pixels.

4. The imaging device of claim 1, wherein each total gain is less than 1.

5. The imaging device of claim 1, further comprising:
    a white balance unit configured to apply channel gains to the respective color values of the pixel, wherein each total gain is based on a product of the falloff gain and the channel gain applied to the respective color values of the pixel.

6. The imaging device of claim 5, wherein each total gain is less than 1.

7. The imaging device of claim 1, wherein the clamp threshold unit is further configured to generate each product in a set of products for generating the clamp threshold.

8. The imaging device of claim 7, wherein the clamp threshold unit is further configured to multiply a color channel maximum valid range value for a color channel by the total gain applied to the respective color value corresponding to the color channel for generating each product in the set of products.

9. The imaging device of claim 8, wherein the clamp threshold unit is further configured to generate the clamp threshold based on a minimum product of the set of products generated by the multiplication.

10. The imaging device of claim 8, wherein the clamp threshold unit is further configured to adjust downward the color channel maximum valid range value based on a color channel black level.

11. A method for processing a digital image, comprising:
    applying falloff gains to respective color values of a plurality of color channels associated with a pixel by a radial falloff unit;
    generating, by a clamp threshold unit, a clamp threshold based on a minimum value of a set of values for the color values of the pixel, the color values of the pixel being based on total gains applied to the respective color values for the pixel, each total gain based on the falloff gains applied to the respective color values for the pixel; and
    limiting the color values for the pixel to the clamp threshold by a clamping unit.

12. The method of claim 11, further comprising:
    generating an image having a plurality of pixels, each pixel having the plurality of color channels, each color channel having a color value.

13. The method of claim 11, wherein the clamp threshold has different values within an image including the plurality of pixels.

14. The method of claim 11, wherein each total gain is less than 1.

15. The method of claim 11, further comprising:
    applying channel gains to the respective color values of the pixel, wherein each total gain is based on a product of the falloff gains and the channel gains applied to the respective color values of the pixel.

16. The method of claim 15, wherein each total gain is less than 1.

17. The method of claim 13, further comprising:
    generating each product in a set of products for generating the clamp threshold.

18. The method of claim 17, wherein generating each product comprises multiplying a color channel maximum valid range value for a color channel by the total gain applied to the respective color value corresponding to the color channel.

19. The method of claim 18, further comprising:
generating the clamp threshold based on a minimum product of the set of products generated by the multiplication.

20. The method of claim 18, further comprising:
adjusting downward the color channel maximum valid range value based on a color channel black level.

* * * * *